(12) United States Patent
Andy et al.

(10) Patent No.: US 9,041,298 B2
(45) Date of Patent: May 26, 2015

(54) MOTION ACTIVATED TOILET BOWL LIGHTING DEVICE

(76) Inventors: Brian R. Andy, Sunrise, FL (US); Jeff S. Barbieri, Sunrise, FL (US)

( * ) Notice: Subject to any disclaimer, the term of this patent is extended or adjusted under 35 U.S.C. 154(b) by 430 days.

(21) Appl. No.: 13/567,252

(22) Filed: Aug. 6, 2012

(65) Prior Publication Data
US 2013/0038225 A1 Feb. 14, 2013

Related U.S. Application Data

(60) Provisional application No. 61/521,943, filed on Aug. 10, 2011.

(51) Int. Cl.
*H05B 37/02* (2006.01)
(52) U.S. Cl.
CPC .............. *H05B 37/0227* (2013.01); *Y02B 20/44* (2013.01)
(58) Field of Classification Search
CPC ............................ H05B 37/0227; Y02B 20/44
USPC ......... 315/159, 120, 133, 134, 150, 155, 156, 315/158
See application file for complete search history.

(56) References Cited

U.S. PATENT DOCUMENTS

| 5,003,648 | A | 4/1991 | Anderson |
| 5,136,476 | A | 8/1992 | Horn |
| 5,513,397 | A | 5/1996 | Terry |
| 5,611,089 | A | 3/1997 | Cretors |
| 5,664,867 | A | 9/1997 | Martin et al. |
| 5,763,872 | A | * | 6/1998 | Ness ........................ 250/214 AL |
| 5,946,209 | A | * | 8/1999 | Eckel et al. ...................... 700/14 |
| 6,003,160 | A | 12/1999 | Seidle et al. |
| 6,203,164 | B1 | 3/2001 | Tufekci et al. |
| 7,036,158 | B2 | 5/2006 | Bradford et al. |
| 2004/0184273 | A1 | 9/2004 | Reynolds et al. |
| 2005/0071917 | A1 | 4/2005 | Landon |
| 2010/0313341 | A1 | 12/2010 | Jordan |

* cited by examiner

*Primary Examiner* — Jung Kim
(74) *Attorney, Agent, or Firm* — Dale J. Ream

(57) ABSTRACT

A motion activated toilet bowl lighting device includes a body member having inner, outer, top, and bottom walls that define an interior area. The inner wall includes an inwardly annular configuration complementary to a toilet bowl rim outer surface. The lighting device includes an attachment arm displaced from the inner wall. A bridge connects the top wall to the attachment arm such that the inner wall, attachment arm, and bridge sandwich the toilet rim. A motion detector is positioned on the outer wall and a light is positioned on the attachment arm. A light sensor is positioned on the body member. A battery and timer are situated in the interior area. The light is energized when the light sensor detects lower than a predetermined amount of ambient light and when the motion detector detects movement, the light being de-energized when the timer expires.

13 Claims, 3 Drawing Sheets

MOTION ACTIVATED TOILET BOWL LIGHTING DEVICE

REFERENCE TO RELATED APPLICATIONS

This non-provisional patent application claims the benefit of provisional application Ser. No. 61/521,943 filed on Aug. 10, 2011, titled Motion Activated Toilet Bowl Lighting Device.

BACKGROUND OF THE INVENTION

This invention relates generally to lighting devices and, more particularly, to a toilet bowl lighting device that is actuated upon detection of motion so long as the level of ambient light is below a predetermined level. In other words, the motion activated toilet bowl lighting device is configured to energize a light situated adjacent a toilet bowl when a person enters a bathroom while the bathroom light is off.

Turning a light on when entering a bathroom in the middle of the night after being asleep or otherwise in a darkened room can be an uncomfortable or undesirable experience in that the bright lights may seem almost blinding. In other words, the lights of the bathroom seem overly bright when a person's eyes have naturally adjusted to the darkness. After using the toilet and turning off the lights, it may then be difficult to navigate back to bed in that the person's eyes must readjust to the darkness. For these reasons, a person may choose not to turn the lights on at all when walking into a bathroom which leads to obvious difficulties of potentially stumbling over obstacles, finding the toilet, or actually using the toilet.

Various devices have been proposed in the art for providing a soft or dim light in a bathroom at night, such as a nightlight, or for energizing a light attached to a toilet bowl when the toilet bowl lid is raised. Although assumably effective for their intended purposes, the existing devices do not satisfy the need to energize a light situated in the toilet bowl when a person is detected entering the bathroom and then for de-energizing the light either when the person is detected leaving the bathroom or after a predetermined amount of time.

Therefore, it would be desirable to have a motion activated toilet bowl lighting device that may be positioned on the rim of a toilet bowl having a light positioned toward the interior of the toilet bowl and that energizes the light when motion in the room is detected. Further, it would be desirable to have a motion activated toilet bowl lighting device that is only activated when the ambient light in the room is below a predetermined level. In addition, it would be desirable to have a motion activated toilet bowl lighting device that deactivates the light after a predetermined time after being energized.

SUMMARY OF THE INVENTION

A motion activated toilet bowl lighting device according to the present invention includes a body member having inner, outer, top, and bottom walls that define an interior area. The inner wall includes an inwardly annular configuration complementary to a toilet bowl rim outer surface. The lighting device includes an attachment arm displaced from the inner wall. A bridge connects the top wall to the attachment arm such that the inner wall, attachment arm, and bridge sandwich the toilet rim. A motion detector is positioned on the outer wall and a light is positioned on the attachment arm. A light sensor is positioned on the body member. A battery and timer are situated in the interior area. The light is energized when the light sensor detects lower than a predetermined amount of ambient light and when the motion detector detects movement, the light being de-energized when the timer expires.

A general object of this invention is to provide a motion activated toilet bowl lighting device that may be positioned on the rim of a toilet bowl having a light positioned toward the interior of the toilet bowl and that energizes the light when motion in the room is detected Another object of this invention is to provide a motion activated toilet bowl lighting device, as aforesaid, that is only activated when the ambient light in the room is below a predetermined level.

Still another object of this invention is to provide a motion activated toilet bowl lighting device, as aforesaid, that deactivates the light after a predetermined time after being energized.

Yet another object of this invention is to provide a motion activated toilet bowl lighting device, as aforesaid, that is easy to use and inexpensive to produce.

The objects and advantages of the present invention will become apparent from the following description taken in connection with the accompanying drawings, wherein is set forth by way of illustration and example, embodiments of this invention.

DESCRIPTION OF THE PREFERRED EMBODIMENT

Figure 1:
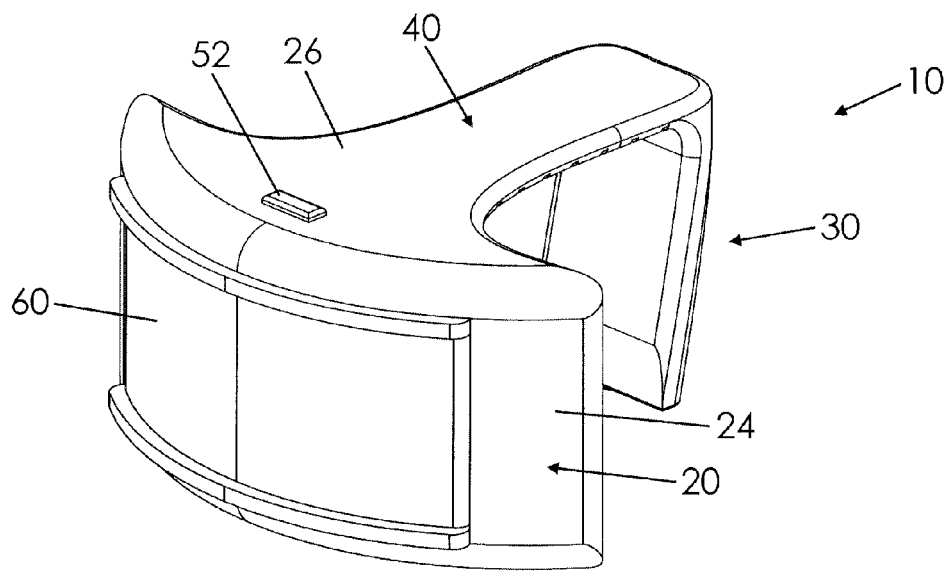
FIG. 1 is a perspective view of a motion activated toilet bowl lighting device according to a preferred embodiment of the present invention.

A motion activated toilet bowl lighting device according to a preferred embodiment of the present invention will now be described in detail with reference to FIGS. 1 to 6 of the present invention. The toilet bowl lighting device 10 includes a body member 20, an attachment arm 30, a bridge 40 connecting the body member 20 and attachment arm 30, a light 50, a light sensor 52, and a motion detection unit 60.

The body member 20 includes an inner wall 22 defining an inwardly annular or concave configuration that is complementary to an outwardly annular outer surface of a toilet bowl (not shown). The body member 20 also includes an outer wall 24 having a generally outwardly annular or convex configuration that is coupled to end edges of the inner wall 22 and extends outwardly therefrom. The body member 20 includes a top wall 26 and a bottom wall 28 that connect the inner 22 and outer 24 walls together. The walls collectively define an interior area. The body member 20 may include a battery door (not shown) that, when pivotally opened, provides access to the interior area such as to replace a battery 82.

Figure 2:
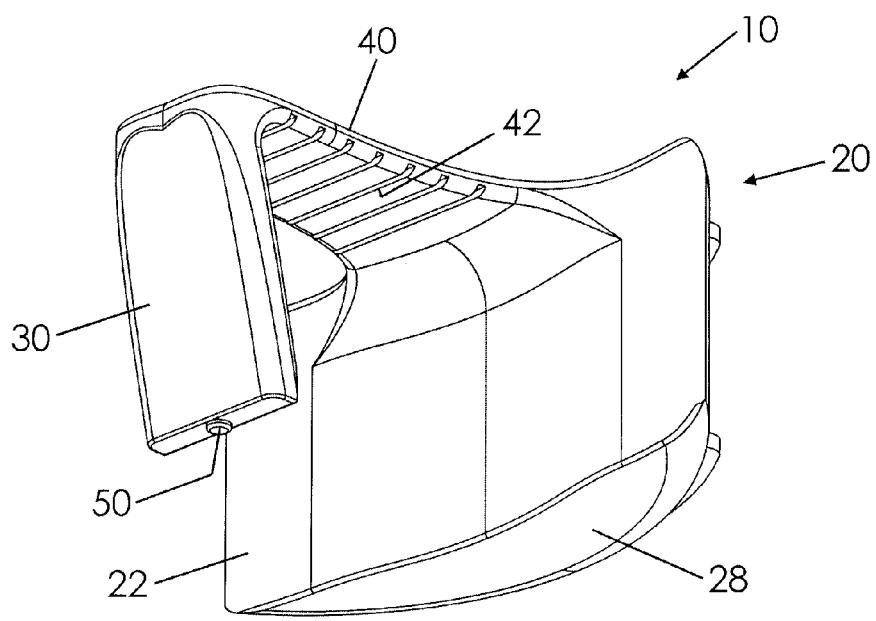
FIG. 2 is a perspective view of the toilet bowl lighting device from another angle.
Figure 3:
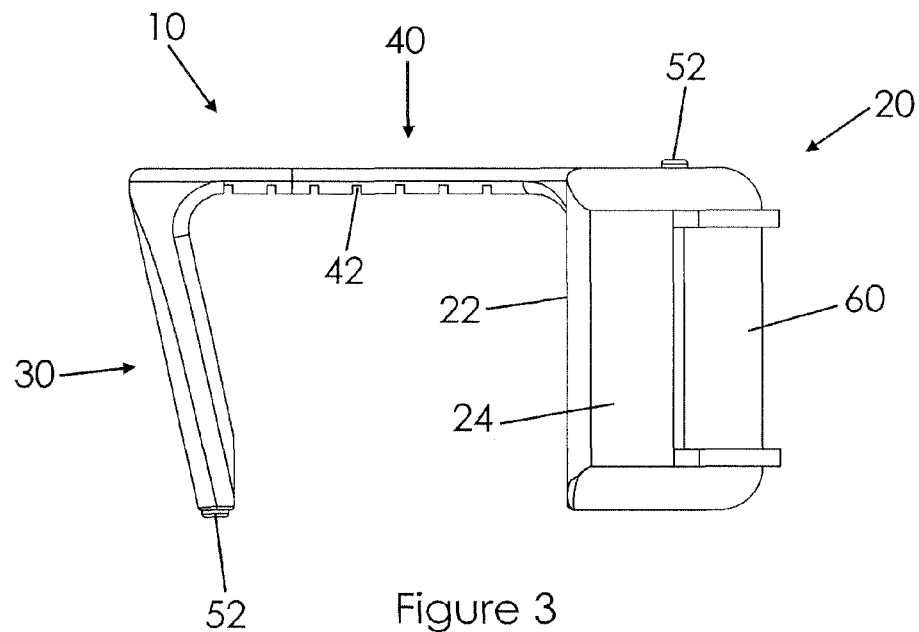
FIG. 3 is a side view of the toilet bowl lighting device as in FIG. 1.
Figure 4:
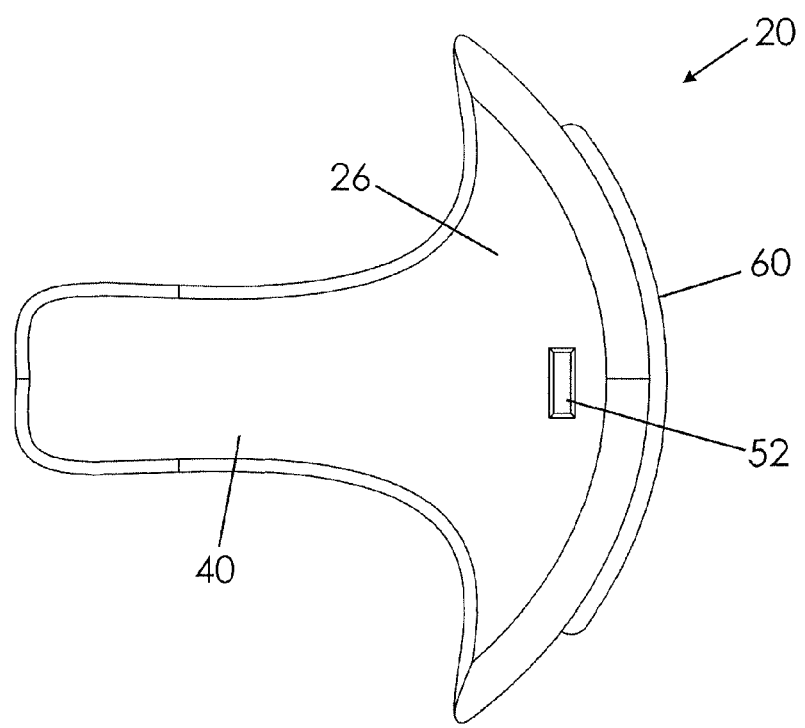
FIG. 4 is a top view of the toilet bowl lighting device as in FIG. 1.

The attachment arm 30 is displaced from the body member 20. The attachment arm 30 may be generally parallel to the inner wall 22 of the body member 20 although it is preferred that the attachment arm 30 be slightly offset thereto (FIGS. 2 and 3). In other words, the attachment arm 30 may be angled inwardly as shown in FIG. 3 and gently biased in that direction. The attachment arm 30 and inner wall 22 of the body member 20 are separated from one another and configured to sandwich the rim of a toilet bowl therebetween.

The bridge 40 connects the top wall 26 of the body member 20 with an upper end of the attachment arm 30. The attachment arm 30, bridge 40, and inner wall 22 of the body member 20 are configured to selectively clamp onto the rim of a toilet bowl (not shown). The bridge 40 includes a lower surface that defines a plurality of score marks 42 (also referred to as spaced apart lines of weakness) that resist sliding movement along the toilet bowl rim when positioned thereon. It is understood that the attachment arm 30 and bridge 40 may include a construction that is biased inwardly so as to securely clamp onto a toilet bowl rim. The body member 20, attachment arm 30, and bridge 40 therebetween may include a unitary construction.

The toilet bowl lighting device 10 includes the following electronic components. The motion detection unit 60 is situated on the outer wall 24 of the body member 20 and is electrically connected to the battery positioned inside the body member interior area. Preferably, the motion detection unit 60 is of a type having a wide angle motion sensor although having more than one motion sensor may also work. The motion detection unit 60 may be directed away from the body member 20 so as to detect motion a distance away from the body member 20, for example, when a person walks into the room. Preferably, the light 50 is a light emitting diode (LED) that is situated on an exterior surface of the attachment arm 30 so as to illuminate a toilet bowl when the lighting device 10 is coupled to a toilet bowl rim. A light sensor 52 may be positioned on the outer surface of the body member top wall 26 and is electrically connected to the battery 82. It is understood that either circuitry or a simple microprocessor may be enclosed within the interior area of the body member 20 that is configured to carry out the operations described below.

More particularly, the motion detection unit 60, light 50, and light sensor 52 are electrically connected to the battery to energize the light 50 under predetermined conditions. First, the circuit is only operative to energize the light 50 if less than a predetermined level of ambient light is sensed by the light sensor 52. Specifically, the light sensor 52 may include its own dedicated circuit that is "closed" or activated only when the predetermined light level is experienced. If the light sensor 52 is activated, the circuitry may enable current to flow from the battery 82 to the motion detection unit 60. When energized, the motion detection unit 60 senses movement within a predetermined space, such as a bathroom. If motion is detected, the circuitry is configured to enable current to flow from the battery 82 to the light 50, thus energizing the light 50. In some embodiments, energizing the light 50 may also actuate a timer 70. After a predetermined amount of time, the timer 70 may cause current to the light 50 to be interrupted, leaving the circuit in a rest state in which the ambient light level is once again to be determined. In another embodiment, the light 50 may be de-energized when the motion detection unit 60 detects motion a second time which may indicate that a user has left the bathroom.

Figure 5:
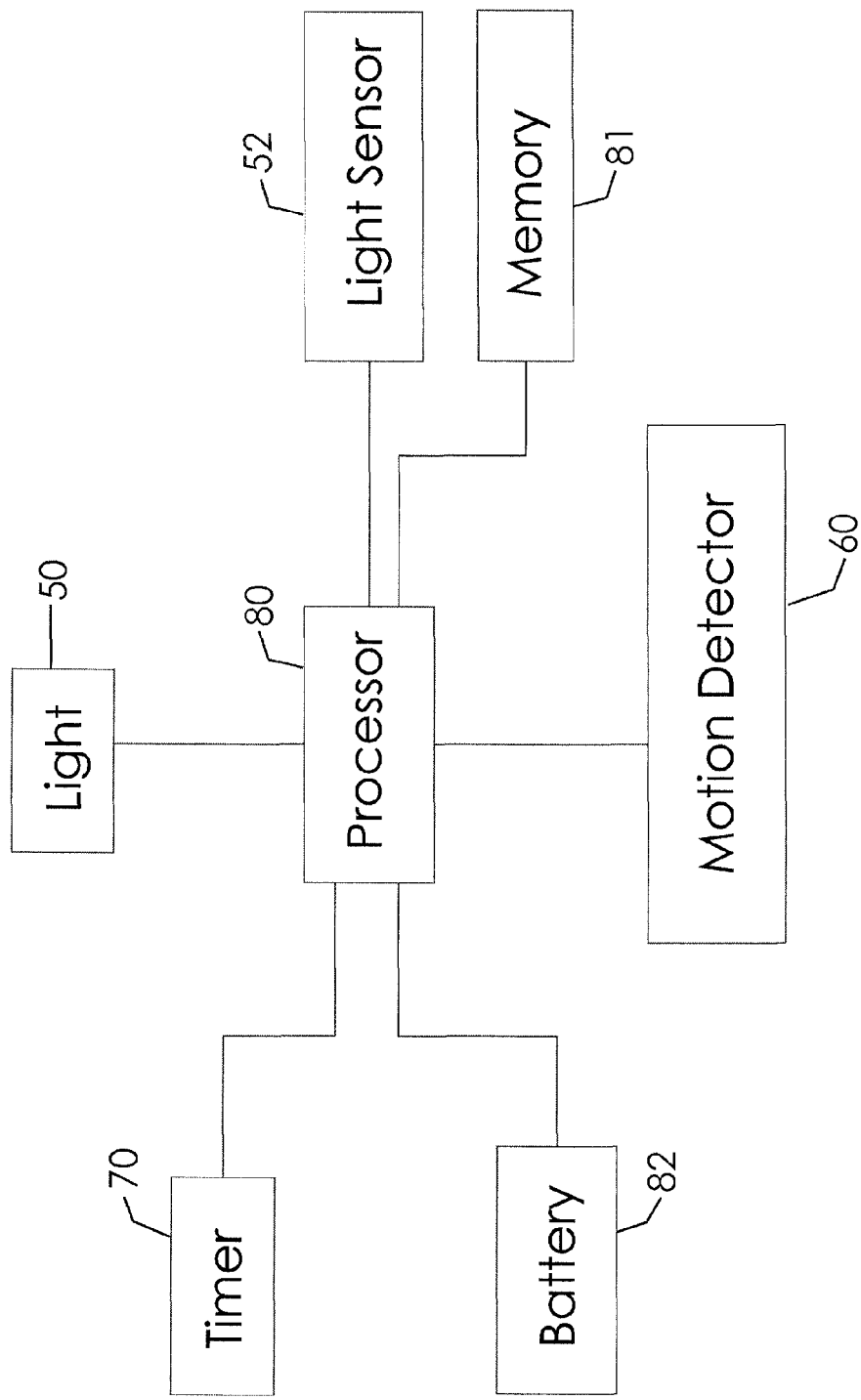
FIG. 5 is a block diagram illustrating the electronic components of the device.

In one embodiment, the logic of the circuitry described above may also be managed by a processor 80 having a memory 81 with appropriate programming instructions stored thereon (FIG. 5). The processor 80 may be electrically connected to all of the respective electronic components as shown in FIG. 5 so as to monitor the sensors and control actuation of the light 50. More particularly, the programming instructions may cause the processor 80 to determine if the light sensor detects an amount of ambient light that is less than a predetermined amount and if the motion detector detects movement and, if so, to permit the battery to energize said light. In addition, the programming instructions may cause the processor 80 to determine if the light 50 has been energized and, if so, to actuate the timer 70 to begin measuring a predetermined amount of time (e.g. to count up or down). The programming instructions then cause the processor 80 to de-energize the light 50 when the timer 70 reaches the predetermined amount of time, i.e. it times out. It is understood that the processor 80 is capable of performing the other functions described about relative to circuitry.

In use, the motion activated toilet bowl lighting device 10 may be mounted on the rim of a toilet bowl, the attachment arm 30 and bridge 40 being configured so that the device is held tightly on the rim as described above. The inner wall 22 of the body member 20 is held tightly against the outer wall of the toilet bowl and the light 50 is positioned so as to illuminate the interior of the toilet bowl when the light is energized. According to the circuitry or programming of the processor 80, the light is energized when ambient light is sensed by the light sensor 52 to be below a predetermined amount and when motion is detected by the motion detection unit 60. Electrical current to the light 50 is interrupted upon expiration of a predetermined amount of time counted by the timer 70 or upon detection of another movement.

It is understood that while certain forms of this invention have been illustrated and described, it is not limited thereto except insofar as such limitations are included in the following claims and allowable functional equivalents thereof.

The invention claimed is:

1. A motion activated toilet bowl lighting device for use with a toilet having a toilet bowl, comprising:
    a body member having inner, outer, top, and bottom walls that define an interior area, said inner wall having a configuration complementary to a rim of the toilet bowl;
    an attachment arm displaced from said inner wall of said body member;
    a bridge connecting said attachment arm to said inner wall of said body member;
    a motion detector situated on said body member and directed away from said body member so as to detect motion a distance away from said body member;
    wherein said attachment arm, said bridge, and said body member are configured to selectively attach to the toilet bowl rim;
    a light sensor positioned on said body member and configured to detect ambient light;
    a light situated on said attachment arm and configured to illuminate the toilet bowl when energized while said body member is coupled to the toilet bowl rim; and
    a battery positioned in said body member interior area and configured to energize said light when said motion detector senses motion and said light sensor detects less than a predetermined amount of ambient light;
    wherein said light and said motion detector are configured to de-energize said light when said motion detector senses movement and said light is already energized.

2. The motion activated toilet bowl lighting device as in claim 1, further comprising a timer electrically connected to said battery and to said light, said timer being configured to be actuated to measure a predetermined amount of time when said light is energized, said timer configured to de-energize said light after said predetermined amount of time.

3. The motion activated toilet bowl lighting device as in claim 2, wherein said body member inner wall, said bridge, and said attachment arm include a generally inverted U-shaped configuration that selectively sandwiches said toilet bowl rim.

4. The motion activated toilet bowl lighting device as in claim 3, wherein said attachment arm includes a distal end biased inwardly toward said body member.

5. The motion activated toilet bowl lighting device as in claim 2, wherein said light and said light sensor are configured to de-energize said light when said light sensor detects an amount of ambient light greater than said predetermined amount of ambient light.

6. The motion activated toilet bowl lighting device as in claim 1, wherein said light and said light sensor are configured to de-energize said light when said light sensor detects an amount of ambient light greater than said predetermined amount of ambient light.

7. The motion activated toilet bowl lighting device as in claim 2, wherein said inner wall of said body member includes a generally annular configuration that is complementary to a configuration of an outer surface of the toilet bowl rim.

8. The motion activated toilet bowl lighting device as in claim 1, wherein said light is positioned at a distal end of said attachment arm and directed to illuminate downwardly when energized.

9. The motion activated toilet bowl lighting device as in claim 8, wherein said light is a light emitting diode.

10. The motion activated toilet bowl lighting device as in claim 1 wherein said motion detector is situated on said body member outer wall, is directed away from said body chamber, and includes a wide angle motion sensor so as to detect motion a predetermined distance away from said body member.

11. The motion activated toilet bowl lighting device as in claim 3, wherein said bridge includes a bottom surface that defines a plurality of score marks that resist movement along the toilet bowl rim when situated thereon.

12. The motion activated toilet bowl lighting device as in claim 2, further comprising:
 a processor electrically connected to said timer, said light, said light sensor, said motion detector, and said battery;
 a memory electrically connected to said processor having a plurality of programming instructions; and
 wherein said programming instructions, when executed by said processor, cause said processor to determine if said light sensor detects an amount of ambient light that is less than a predetermined amount and if said motion detector detects movement and, if so, to permit said battery to energize said light.

13. The motion activated toilet bowl lighting device as in claim 12, wherein:
 said programming instructions, when executed by said processor, cause said processor to determine if said light has been energized and, if so, to actuate said timer to measure a predetermined amount of time; and
 said programming instructions, when executed by said processor, cause said processor to de-energize said light when said timer has timed out.

\* \* \* \* \*